(12) United States Patent
Guest et al.

(10) Patent No.: US 11,637,427 B2
(45) Date of Patent: Apr. 25, 2023

(54) DAMPING OSCILLATIONS USING ACTIVE FILTERS

(71) Applicant: Siemens Gamesa Renewable Energy A/S, Brande (DK)

(72) Inventors: Emerson Guest, Kongens Lyngby (DK); Kim Hoej Jensen, Faxe (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 42 days.

(21) Appl. No.: 17/252,510

(22) PCT Filed: Jun. 5, 2019

(86) PCT No.: PCT/EP2019/064685
§ 371 (c)(1),
(2) Date: Dec. 15, 2020

(87) PCT Pub. No.: WO2019/243055
PCT Pub. Date: Dec. 26, 2019

(65) Prior Publication Data
US 2021/0273452 A1    Sep. 2, 2021

(30) Foreign Application Priority Data
Jun. 20, 2018    (EP) .................................... 18178767

(51) Int. Cl.
*H02J 3/00*      (2006.01)
*H02J 3/18*      (2006.01)

(52) U.S. Cl.
CPC ......... *H02J 3/1842* (2013.01); *H02J 2300/28* (2020.01)

(58) Field of Classification Search
CPC .. H02J 3/24; H02J 3/18; H02J 2300/28; H02J 3/381; H02J 3/386; H02J 3/1842
See application file for complete search history.

(56) References Cited

U.S. PATENT DOCUMENTS 6,249,447 B1 *  6/2001  Boylan ............. H02M 3/33507
                                                   363/97
2011/0255307 A1 * 10/2011  Kim ....................... H02J 3/381
                                                   363/13
(Continued)

FOREIGN PATENT DOCUMENTS

EP    2 793 392 A1    10/2014
WO    2007027141 A1    3/2007
WO    2011032265 A1    3/2011

OTHER PUBLICATIONS

Carrasco J M et al: "Microcomputer control of a fuel cell power system", Industrial Electronics, Control and Instrumenta, vol. 1, Sep. 5, 1994 (Sep. 5, 1994), pp. 473-478, XP010137448.
(Continued)

*Primary Examiner* — Julio C. Gonzalez
(74) *Attorney, Agent, or Firm* — Schmeiser, Olsen & Watts LLP

(57) ABSTRACT

Provided is an arrangement for controlling a converter of a power generation system, for example, a wind turbine, the converter being connected to a connection point to a utility grid, the arrangement including: a measurement section adapted to provide measurement values indicative of values of current and voltage at the connection point, a main converter controller adapted to receive the measurement values and to generate a main converter control signal based on the measurement values, an active filter system adapted to receive the measurement values and to generate an active filter control signal based on the measurement values, an addition element adapted to add the main converter control signal and the active filter control signal and to supply the sum signal as a control signal to the converter.

14 Claims, 4 Drawing Sheets

(56) References Cited

U.S. PATENT DOCUMENTS

2014/0307488 A1* 10/2014 Brogan .................. H02J 3/50
363/35
2018/0052478 A1 2/2018 Varma

OTHER PUBLICATIONS

X. Wang; F. Blaabjerg; Z. Chen: "Synthesis of Variable Harmonic Impedance in Inverter-Interfaced Distributed Generation Unit for Harmonic Damping Throughout a Distribution Network", IEEE Transactions on Industry Applications, vol. 48, No. 4, Jul. 2012 (Jul. 2012), pp. 1407-1417, XP011453495.
International Search Report and Written Opinion for PCT/EP2019/064685 dated Sep. 26, 2019.
Chaudhary, Sanjay K.; Lascu, Cristian Vaslie; Teodorescu, Remus; Kocewiak, ukasz—Voltage Feedback based Harmonic Compensation for an Offshore Wind Power Plant; Published in: Proceedings of the 2016 IEEE International Conference on Power Electronics, Drives and Energy Systems.
Ł. H. Kocewiak, M. Gautschi, L. Zeni, B. Hesselbæk, N. Barberis Negra, T. Stybe Sørensen, B. Blaumeiser, S. Vogelsanger: "Power Quality Improvement of Wind Power Plants by Active Filters Embedded in STATCOMs," in Proc. The 15th International Workshop on Large-Scale Integration of Wind Power into Power Systems as well as Transmission Networks for Offshore Wind Farms, Energynautics GmbH, Nov. 15-17, 2016, Vienna, Austria.
European Search Report and Written Opinion of the European Searching Authority dated Dec. 12, 2018 for Application No. 18178767.2.

* cited by examiner

DAMPING OSCILLATIONS USING ACTIVE FILTERS

CROSS-REFERENCE TO RELATED APPLICATIONS

This application claims priority to PCT Application No. PCT/EP2019/064685, having a filing date of Jun. 5, 2019, which is based on EP Application No. 18178767.2, having a filing date of Jun. 20, 2018, the entire contents both of which are hereby incorporated by reference.

FIELD OF TECHNOLOGY

The following relates to an arrangement for controlling a converter of a power generation system, for example a wind turbine, to a converter system, to a wind turbine and to a method of controlling a converter of a power generation system.

BACKGROUND

A wind turbine may comprise a wind turbine tower, a nacelle mounted on top of the tower harbouring a generator which is driven by plural rotor blades connected to a rotation shaft. The generator may be coupled to a converter, for example having a generator side portion (for example an AC-DC-converter portion) and having a grid-side portion (a DC-AC converter portion). The converter is configured to convert the variable frequency power stream delivered from the generator to a substantially fixed frequency power stream having desired electrical characteristics, for example in terms of frequency, voltage and/or power and/or active power and/or reactive power. The converter may comprise plural controllable switches, such as IGBTs which may be switched at high frequencies such as for example around 2.5 kHz. The controllable switches may be controlled at their respective gate by pulse width modulation signals which may be derived based on a control signal, such as a voltage control (e.g. reference) signal received by the converter from a respective converter controller. The converter may be, via for example a wind turbine transformer, connected to a utility grid, in particular via a point of common coupling to which plural other wind turbines are connected.

Due to the operation of the power converter, in particular wind turbine power converter, low frequency harmonic voltage sources may be generated causing undesired oscillations at the output terminal of the power converter. Low frequency harmonic sources may also be present in the external utility grid. Poorly damped resonances within the wind power plant and/or between the wind power plant (WPP) and the external grid may lead to amplification of these harmonics (voltage and/or current) at one or more point(s) of common coupling (PCC) of the wind power plant. This may lead to issues with grid code compliance if harmonic emission limits are exceeded, resulting in possible down time of the wind power plant. The worst case situation is when the resonances cause an undamped growth of harmonic oscillations, leading to an eventual disconnection of the wind turbine or the entire wind power plant from the utility grid. Both situations may have been encountered when connecting conventional wind turbines to the power grid.

The publication "Voltage Feedback based Harmonic Compensation for an Offshore Wind Power Plant". by Chaudhary, Sanjay K.; Lascu, Cristian Vaslie; Teodorescu, Remus; Kocewiak, ukasz Published in: Proceedings of the 2016 IEEE International Conference on Power Electronics, Drives and Energy Systems, discloses STATCOMS (additional hardware components) which are used to make power quality improvements in offshore wind power plants. Therein, the proposed control scheme is implemented in the wind turbines themselves and therefore does not require additional hardware investment.

The publication by X. Wang, F. Blaabj erg, and Z. Chen, "Synthesis of Variable Harmonic Impedance in Inverter-Interfaced Distributed Generation Unit for Harmonic Damping Throughout a Distribution Network," IEEE Transactions on Industry Applications, vol. 48, no. 4, pp. 1407-1417, July 2012 makes use of an impedance-based active filter but for distributed generation embedded into a voltage-control scheme. However, embedding the active filter in the main control loop is less desirable as the design of the active filter and the main control loop must be considered in combination together. Further, this scheme also relies upon bandpass filtering of the current measurement to extract the correct phase sequence when applying the impedance shaping. Adding additional bandpass filtering into the control loop may be 5 undesirable as more phase shift occurs outside of the center frequency of the active filter. This can degrade the passivity (positive resistance at all frequencies) of the converter, leading to poorer performance and applicability of the active filter.

Thus, there may be a need for an arrangement for controlling a converter, for a converter system, for a wind turbine and for a method of controlling a converter of a power generation system, wherein the above-mentioned disadvantages or problems are at least reduced. Embodiments of the present invention provide an arrangement for controlling a converter and a respective method of controlling a converter, wherein undesired oscillations may efficiently be damped in a simple manner, in particular without re-designing the entire control scheme.

SUMMARY

An aspect relates to an arrangement for controlling a converter of a power generation system, in particular a wind turbine, the converter being connected to a connection point to a utility grid, the arrangement comprising: a measurement section adapted to provide measurement values indicative of values of current and voltage at the connection point; a main converter controller adapted to receive the measurement values and to generate a main converter control signal based on the measurement values; an active filter system adapted to receive the measurement values and to generate an active filter control signal based on the measurement values; an addition element adapted to add the main converter control signal and the active filter control signal and to supply the sum signal as a control signal to the converter.

The arrangement may be implemented in software and/or hardware. According to an embodiment the arrangement is only (exclusively) implemented in software. For example, the control software may simply be updated to include the active filter(s). According to another embodiment is conceivable that an extra piece of hardware be used to implement the active filter.

Different components of the arrangement, for example the main converter controller and the active filter system, may be integrated in a combined control structure or may be present in separate modules. For example, the main converter controller may be or may comprise a conventional converter controller. In this case, the active filter system may be for example retrofitted as an additional component without changing the main converter controller.

The power generation system may be adapted to generate electric power. The power generation system may in particular comprise at least one wind turbine or exactly one wind turbine. At the connection point, for example a point of common coupling, plural wind turbines may be connected. The connection point may be, in particular via a wind park transformer, connected to the utility grid.

The measurement section may measure the values of the current and/or voltage at an output terminal of the converter or at an output terminal of the entire wind turbine or the grid side of a line inductor connected to the output terminal of the converter or close or at the point of common coupling.

The measurement section may measure the values of the current and/or voltage at a point between a wind turbine transformer (connected to the output terminal of the converter) and the connection point or point of common coupling. When the values of current and voltage are not determined close to or at the point of common coupling but at another point between the point of common coupling and the output terminal of the converter, the values of voltage and current at the point of common coupling may be inferred from the measurement values determined at another point of the transmission line using for example a simulation or a mathematical/physical model.

The main converter controller may be a conventional converter controller in particular adapted to perform power control (for example active power control and/or reactive power control) and/or voltage control at the desired grid frequency of 50 Hz or 60 Hz. The main converter controller may not be concerned with control of an electrical quantity at a frequency different from the grid frequency. For example, when providing the measurement values as feedback signals to the main converter controller, all frequencies different from the desired grid frequency may be filtered out.

The active filter system, however, is provided to dampen undesired oscillations at one or more particular frequencies which are different from the grid frequency.

The active filter system may be used to eliminate converter generated harmonic voltage sources produced by the wind turbine converter, and it may be used to dampen oscillations appearing in the WPP and/or in external grid due to resonance.

The active filter system may work in parallel to the main converter controller, be it voltage or current controlled. This may be a much easier method for implementation as the main control loop and the active filter may be decoupled in design and implementation. Furthermore, as a benefit, the proposed scheme may not require bandpass filters and thereby may provide a significant simplification for the (e.g. digital) implementation. The main benefit of not requiring additional bandpass filters may be less phase shift outside of the complex resonator's center frequency. This may be important for maintaining the passivity (positive resistance at all frequencies) of the converter.

The arrangement for controlling the converter according to an embodiment of the present invention makes use of an existing voltage and current measurement system to develop an active filter control structure that augments the primary control scheme in a grid-connected converter.

The active filter system may simultaneously achieve two objections:
1. The active filter system may eliminate the low frequency harmonic voltage sources generated by the wind turbine converter.
2. The active filter system may allow impedance shaping of the converter impedance at specific frequencies where poorly-damped resonances are found to occur.

Point 1 may allow the wind turbine converter to appear as an ideal voltage source at low frequencies. Therefore, the only harmonic sources may be those external to the wind power plant. The switching sideband harmonics may still be present, but they appear at higher frequencies and cannot be eliminated by active methods applied within the converter.

Point 2 may allow the wind turbine converter to act as a programmable impedance. This may then be used to damp resonances that occur between the wind power plant and the external power grid.

Thereby, a simple control arrangement may be provided achieving effective damping of undesired oscillations at the connection point.

According to an embodiment of the present invention, the active filter system is adapted to dampen or primarily even eliminate at least one low frequency harmonic oscillation generated by the converter and/or to allow impedance shaping of a converter impedance at at least one specific frequency. The active filter system may eliminate at least one low frequency harmonic oscillation generated by the converter.

The damping (increasing the resistive part of the converter impedance) aims to reduce oscillations elsewhere in the wind power plant.

The low frequency harmonic oscillation may for example be an oscillation close to a desired grid frequency, such as 50 Hz, and may for example lie within a range between 0 Hz and smaller than 50 Hz and/or greater than 50 Hz and smaller than 200 Hz for example. Other values are possible. The impedance shaping may be achieved by appropriately controlling the converter using for example a particular voltage reference designed such that the oscillations at particular frequencies are damped and/or that the impedance is very high for these specific frequencies. Thereby, effective damping of undesired oscillations may be achieved.

Tuning the active filter system (also) at sub-synchronous (<50 Hz) frequencies may be possible but may not be the main application.

The main application may be in resonance damping at harmonic orders of the fundamental frequency component i.e. damping at 250 Hz and/or 350 Hz and/or 550 Hz, etc.

According to an embodiment of the present invention, the active filter system controls at least one electrical quantity at frequencies different from and/or independent of any frequency at which the main converter controller controls the electrical quantity, wherein the main converter controller is in particular configured to control power output and/or voltage output and/or current output of the converter at a frequency, in particular the fundamental electrical frequency, being different from any center frequency of any active filter control portion.

The active filter system may control the impedance and harmonic voltage sources of the converter at frequencies different from any frequency at which the main converter control controls the same electrical quantity.

Thereby, the active filter system and the main converter controller may act independently and decoupled from each other such as not to interfere in a disturbing manner. As long as this property is satisfied, the main converter controller and the active filter system may be designed independently from each other without considering interaction of the respective other control portion. In other embodiments there may be an impact or interaction of the active filter on the main converter control that may be assessed and taken into account.

The voltage and current feedbacks normally available to the main control of the wind turbine converter may be used by the active filter as feedback signals. The voltage and current measurements at the grid side of an inductor connected to the converter output terminal may by use as feedbacks.

According to an embodiment of the present invention, the active filter system comprises plural active filter portions for plural considered center frequencies each outputting a, in particular transformed, frequency specific active filter control signal, wherein the frequency specific active filter control signals are added to result in the, in particular transformed, active filter control signal.

For each frequency (or frequencies around the respective center frequency) for which damping and/or impedance shaping is desired, a respective active filter portion may be present within the active filter system. All these may act independently from each other and in parallel and decoupled from each other. Their respective output control signal, i.e. the frequency specific active filter control signals may be combined, in particular added together, to result in the active filter control signal which is afterwards summed with the main converter control signal and the sum may be supplied to the converter. Thereby, converter impedance shaping at plural different specific frequencies may be enabled, allowing to effectively damp oscillations at all these particular frequencies or frequency ranges around the respective center frequencies.

According to an embodiment of the present invention, the plural active filter portions are configured to dampen or even eliminated at least one harmonics of a nominal grid frequency, in particular at least one of plural odd harmonics.

Super-synchronous frequencies (>50 Hz) such as harmonics and interharmonics of the fundamental grid frequency are intended to be filtered using the active filter system.

Converter generated voltage harmonics may in fact be eliminated at the center frequency of the active filter.

Damping may refer to the impedance shaping aspect of the active filter, where the resistive part of the converter impedance is increased.

Oscillations at all harmonics (less than half of the converter's sampling frequency (Nyquist limit)) of the fundamental and/or grid frequency may be damped by providing for each of these harmonics respective active filter portions having the appropriate center frequency. Furthermore, oscillations at frequencies different from harmonics of the fundamental and/or grid frequency may be damped by providing for each of these harmonics respective active filter portions having the appropriate center frequency.

According to an embodiment of the present invention, the active filter system comprises: a transformation module for transforming the values of the current and the voltage to a respective α-component and a β-component of a αβ-frame or to a respective d-component and a q-component of the dq-coordinate frame rotating with the fundamental electrical frequency; a back-transformation module adapted to back-transform the transformed active filter control signal to derive the active filter control signal.

The (e.g. single) transformation module may provide for all active filter portions respective transformed current and voltage values, in particular each having two components. The transformation module may allow a simplification of the calculations, since from three electrical phases (for example A, B, C) requiring three components of voltage and current, each, to respective two components is transformed, thereby simplifying the calculations. The back-transformation module may be applied after summing up all the frequency specific active filter control signals thereby requiring only a single back-transformation module. Thereby, the arrangement may be simplified.

According to an embodiment of the present invention, at least one, in particular each, active filter portion is characterized by: a center frequency; a desired resistance; and a desired reactance, and outputs a, in particular transformed, center frequency specific voltage signal configured to achieve an impedance of the converter at the center frequency defined by the desired resistance and the desired reactance.

Each active filter portion may be characterized by a particular transfer function or frequency response which may in turn be characterized by the center frequency, the desired resistance and the desired reactance. Each or at least one active filter portion may comprise at least a complex multiplication element, an optional complex phase shift element and a complex resonator. The additional complex phase shift element may compensate for any sampling and computation delays that may exist due to the digital control system. Different phase shifts may be applied for the voltage and current because, in general, they might use different sampling techniques. Thereby, the arrangement may be constructed from conventionally known elements or modules.

According to an embodiment of the present invention, at least one, in particular each, active filter portion comprises: a multiplication element adapted to multiply the transformed value of the current with a complex number representing the desired resistance and the desired reactance (e.g. to be achieved at the connection point); an addition (or difference) element adapted to derive a voltage error (or sum or difference) of the complex number multiplied transformed value of the current and the transformed value of the voltage; a complex resonator tuned at the particular center frequency adapted to receive the voltage error and output the, in particular transformed, center frequency specific voltage signal.

The output of the addition element may be supplied via a sign conversion element to the complex resonator. Thus, the complex resonator may receive the negative of the output of the addition element.

The complex resonator may act as a controller which adjusts the output ideally such that the input is zero. If the input of the complex resonator is zero, the converter effectively has an impedance at the considered center frequency being equal to the desired resistance and desired reactance defined in the complex number of the multiplication element.

According to an embodiment of the present invention, at least one complex resonator has a transfer function or frequency response characterized by response magnitude and response phase, wherein the response magnitude has a peak at the respective center frequency and the response phase is equal to 90° for frequencies smaller than the respective center frequency and/or is equal to −90° for frequencies greater than the respective center frequency and/or the phase is precisely zero at the center frequency, wherein the transfer function is characterized by $$k/(s-j\omega 1),$$

where k is a constant,
s is the Laplace variable,
j is the imaginary unit, and
ω1 is the respective center frequency.

This is the continuous-time transfer function of the complex resonator. In this case 's' is the complex Laplace variable. Variations of the complex resonator may also be used, in particular a discrete-time complex resonator (e.g. for a digital implementation). The discrete-time complex resonator can be derived from the continuous-time complex resonator hence the continuous-time complex resonator is shown for generality.

The transfer function may be defined in the Laplace domain. The frequency response of the transfer function may be calculated in the frequency domain.

The complex resonator may therefore change the amplitude of the signal and change also the phase of the signal. The output of the complex resonator may thus correspond to the input having a changed magnitude and a changed phase.

The complex resonator may be designed in the frequency domain. The implementation is based in the time-domain using the sampled input signal.

According to an embodiment of the present invention, the control signal is provided to a grid-side portion, in particular DC-AC-portion, of the converter, wherein the control signal is used as a voltage reference for the converter based on which pulse width modulation signals for controllable switches are derived.

The converter may comprise in particular a generator side portion, a DC link and a grid-side portion. Only the grid-side portion may be controlled by the arrangement. The voltage reference may define a desired voltage at the output terminal of the converter. The voltage reference may comprise plural frequency components, in particular one for each active filter portion comprised in the active filter system and at least one frequency portion as generated by the main converter controller. The pulse width modulation signals may define in which fraction of a pulse width modulation period respectively controllable switches of the converter are supposed to be in the conducting state or on the non-conducting state. Thereby, a conventional converter generator design may be supported.

According to an embodiment of the present invention, the arrangement further comprises at least one passive filter, implemented as: at least one inductance series connected between the output terminal of the converter and the connection point; and/or at least one capacitance shunt connected to the connection point.

The passive filter may be different from the active filter system in that they do not comprise any control logic different from the active filter system. The passive filter may supplement the entire filter capability of the arrangement.

According to an embodiment of the present invention it is provided a converter system, comprising: a converter, having at least a grid-side portion; and an arrangement according to one of the preceding embodiments, connected to control the grid-side portion of the converter.

According to an embodiment of the present invention it is provided a wind turbine, comprising: a generator at which a rotor having plural rotor blade is connected; and a converter system according to the preceding embodiment connected to generator output terminals.

It should be understood, that features, individually or in any combination, disclosed, described, explained or applied to an arrangement for controlling a converter of a power generation system may also be applied or provided for, individually or in any combination, to a method of controlling a converter of a wind turbine according to embodiments of the present invention and vice versa.

According to an embodiment of the present invention it is provided a method of controlling a converter of a power generation system, in particular a wind turbine, the converter being connected to a connection point to a utility grid, the arrangement comprising: providing measurement values indicative of values of current and voltage at the connection point; receiving the measurement values and generating a main converter control signal based on the measurement values; receiving the measurement values and generating an active filter control signal based on the measurement values; adding the main converter control signal and the active filter control signal and supplying the sum signal as a control signal to the converter.

BRIEF DESCRIPTION

Some of the embodiments will be described in detail, with references to the following Figures, wherein like designations denote like members, wherein:

FIG. 1 schematically illustrates a wind turbine according to an embodiment of the present invention;

FIG. 2 schematically illustrates an active filter system according to an embodiment of the present invention which may for example be included in the wind turbine illustrated in FIG. 1;

DETAILED DESCRIPTION

Figure 1:
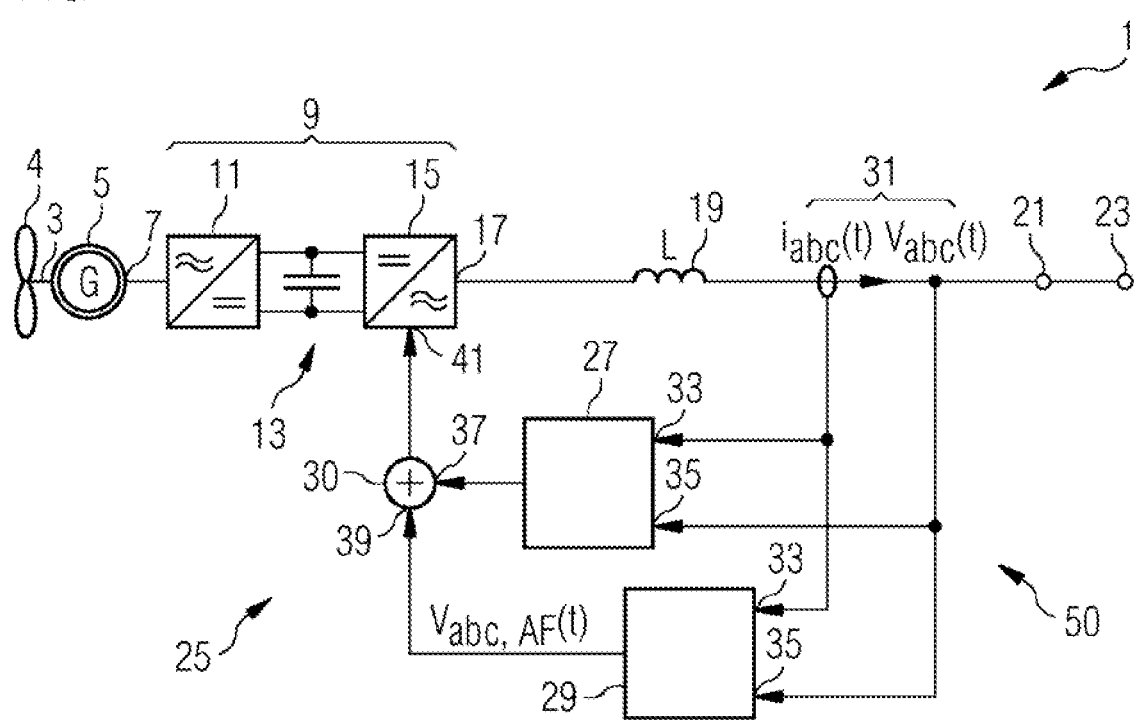

The wind turbine 1 schematically illustrated in FIG. 1 comprises a rotation shaft 3 at which plural rotor blades 4 are connected. The rotation shaft 3 is coupled to an electrical generator 5, for example a permanent magnet synchronous machine, which outputs at an output terminal 7 a power stream, for example provided in three different phases A, B, C.

The three-phase power stream is supplied to a converter 9 which comprises a generator side portion 11, in particular a AC-DC converter portion, a DC link 13 and a grid-side converter portion 15, in particular a DC-AC converter portion. The generator side portion 11 converts the variable frequency power stream generated by the generator 5 to a (substantially) DC power stream at the DC link 13. The grid-side converter portion 15 converts the DC power stream to a fixed frequency (e.g. grid frequency 50 Hz or 60 Hz) power stream at an output terminal 17 of the converter 9.

An inductance 19 (example of a passive filter) is present between the output terminal 17 of the converter and a point of common coupling 21 to which plural other (not illustrated) wind turbines may be connected. A utility grid 23 is, via an optional wind park transformer, connected to the point of common coupling. Furthermore, a wind turbine transformer may be arranged in other embodiments between the output terminal of the converter 9 and the point of common coupling 21.

The wind turbine 1 is one example of a power generation system which may in other embodiments be or comprise a photovoltaic power generation system, a water power generation system, a steam turbine power generation system or the like. Embodiments of the present invention are applicable to any of these power generation systems or even other power generation systems. The wind turbine 1 comprises at least the generator 5 and a converter system 25 which comprises at least the grid-side portion 15 of the converter 9, the main converter controller 27 and the active filter system 29 as well as the measurement section 31 and an addition element 30.

An arrangement 50 according to an embodiment of the present invention is formed by the measurement section 31, the main converter controller 27 and the active filter system 29 as well as by the addition element 30. Herein, the measurement section 31 is adapted to provide measurement values indicative of a value(s) 33 of the current and a value(s) 35 of the voltage at the point of common coupling 21, in particular continuously measured/provided over time. The main converter controller 27 is adapted to receive the measurement values 33, 35 and to generate a main converter control signal 37 based on the measurement values 33, 35.

The active filter system 29 is adapted also to receive the measurement values 33, 35 and to generate an active filter control signal 39 based on the measurement values 33, 35. The addition element 30 is adapted and connected to add the main converter control signal 37 and the active filter control signal 39 and to supply the sum signal 41 as a control signal to the converter 9, in particular the grid-side converter portion 15.

The main converter control signal 37 may be adapted to primarily or exclusively control an electrical quantity, such as power or active power and/or reactive power and/or voltage at the desired grid frequency, for example 50 Hz or 60 Hz. The active filter system 29, however, is adapted to eliminate, at least to dampen, at least one low frequency harmonic oscillation generated by the converter 9 and/or to allow impedance shaping of the converter 9 of the converter impedance at at least one specific frequency different from the grid frequency.

Figure 2:
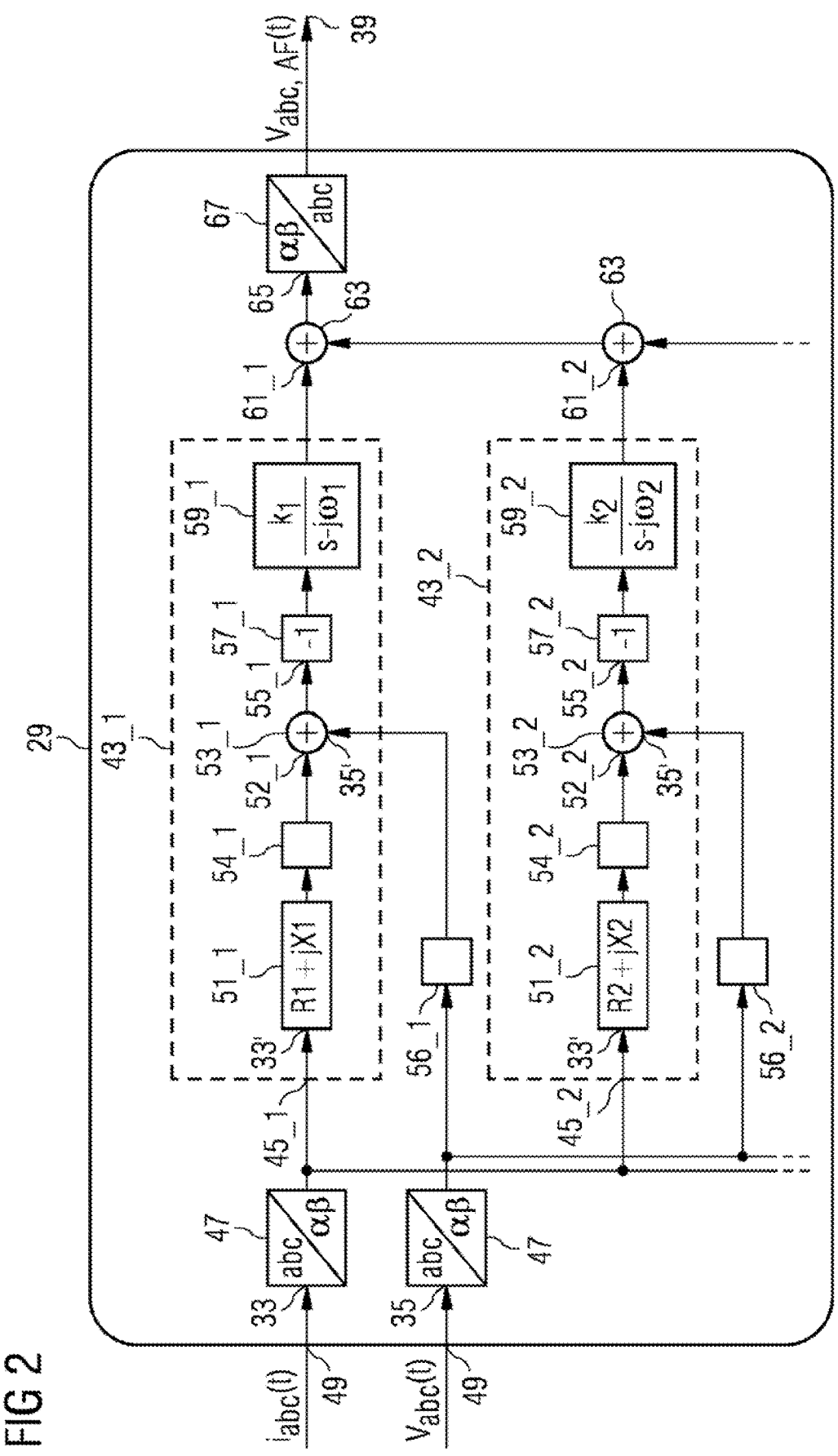

FIG. 2 schematically illustrates a block diagram of an example of an active filter system 29 according to an embodiment of the present invention which may for example be utilized within the arrangement 50 and thereby utilized in the wind turbine 1. The active filter system 29 illustrated in FIG. 2 in a schematic block diagram comprises plural active filter portions from which only two active filter portions 43_1 and 43_2 are illustrated. In other embodiments, the active filter system 29 may comprise only one or more than two active filter portions, such as three, four, five, six or even more than six filter portions, depending on a number of frequencies to be damped.

The active filter system 29 comprises input terminals 49 for receiving the values 33 and 35 of the current and voltage from the measurement system 31. The active filter system 29 further comprises for each the current values 33 and the voltage values 35 a respective transformation module 47. Thereby, the transformation module 47 is adapted to transform the values of the current and the voltage in the abc-frame to a respective α-component and a respective β-component of a αβ-frame being static as the abc-frame of the electrical phases A, B, C.

In another embodiment the transformation module 47 is adapted to transform the values of the current and the voltage in the abc-frame to a respective d-component and a respective q-component of a dq-frame being rotating e.g. with the fundamental electrical frequency.

Each of the active filter portions receives at a respective input terminal 45_1, 45_2, respectively, the transformed values 33' of the current 33, wherein the transformed values 33' of the current values 33 are derived by the transformation modules 47. Each of the active filter portions 43_1, 43_2 comprises a respective multiplication element 51_2, 51_2 which multiplies the transformed values 33' of the current by a complex number representing the desired resistance and the desired reactance to be achieved at the common connection point 21. In the illustrated embodiment, the complex multiplication elements multiply the transformed current values 33' by R1+jX1 and R2+jX2, respectively, wherein R1, R2 are the respective resistance values and the X1, X2 are the respective desired reactance values.

Each of the active filter control portions 43_1, 43_2 further comprises a respective phase shift element 54_1, 54_2 for the complex number multiplied current (e.g. characterized as exp(jϑi1), exp(jϑi2), wherein ϑi1, ϑi2 are the phase shift angles) which is adapted to apply a phase shift to the current, to compensate for any sampling and computation delays that may exist due to the digital control system. Further, each of the active filter control portions 43_1, 43_2 further comprises a respective phase shift element 56_1, 56_2 for the voltage (e.g. characterized as exp(jϑv1), exp(jϑv2), wherein ϑv1, ϑv2 are the phase shift angles) which is adapted to apply a phase shift to the voltage. Different phase shifts may be utilized for the voltage and current because, in general, they might use different sampling techniques.

Each of the active filter control portions 43_1, 43_2 further comprises an addition element 53_1, 53_2 which is adapted to derive a voltage error 55_1, 55_2 of the phase shifted, complex number multiplied transformed value 52_1, 52_2 of the current and the transformed value 35' of the voltage values 35. The voltage error 55_1, 55_2, respectively, is further multiplied by −1 by a sign conversion element 57_1, 57_2.

The outputs of these conversion elements are supplied as inputs to respective complex resonators 59_1, 59_2 which are tuned at a particular center frequency and output a respective transformed center frequency specific voltage signal 61_1, 61_2 which are all added together (from different active filter control portions) using addition elements 63. The result of the addition is the transformed active filter control signal 65.

The active filter system 29 further comprises a back-transformation module 67 which is adapted to back-transform the transformed active filter control signal 65 to derive the active filter control signal 39, in particular a voltage control signal $V_{abc,AF}$ in the static abc-frame.

Each of the active filter control portions 43_1, 43_2 is characterized by a center frequency (for example $\omega_1$, $\omega_2$ for the filter portions 43_1, 43_2, respectively), a desired resistance (for example R1, R2) and a desired reactance (for example X1, X2).

The active filter system 29 comprises a transformation module 47 from the "abc" frame components of voltage and current to a two-component (can be stationary or rotating) frame, comprises further a complex gain "R+jX" and a respective complex resonator. The active filter system permits the impedance to be programmed as to a desired value at a given frequency. Multiple active filter portions may be connected in parallel to target different frequencies.

Figure 3:
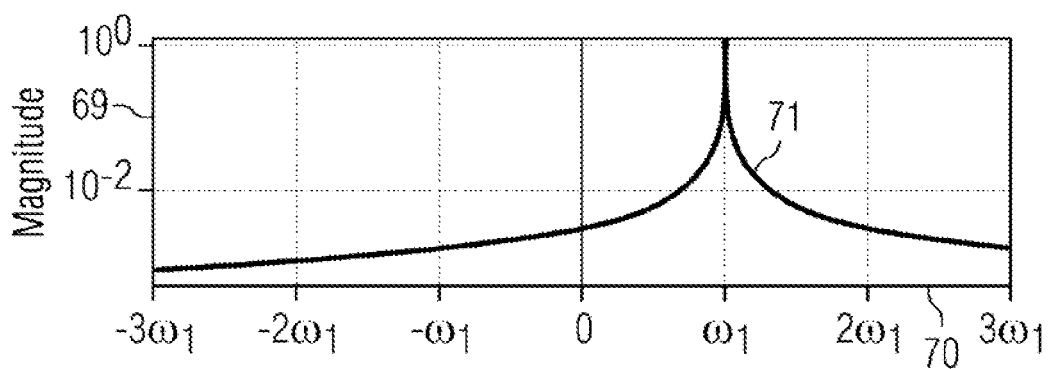
FIG. 3 illustrates characteristics of a complex resonator of an active filter portion as used according to embodiments of the present invention.
Figure 4:
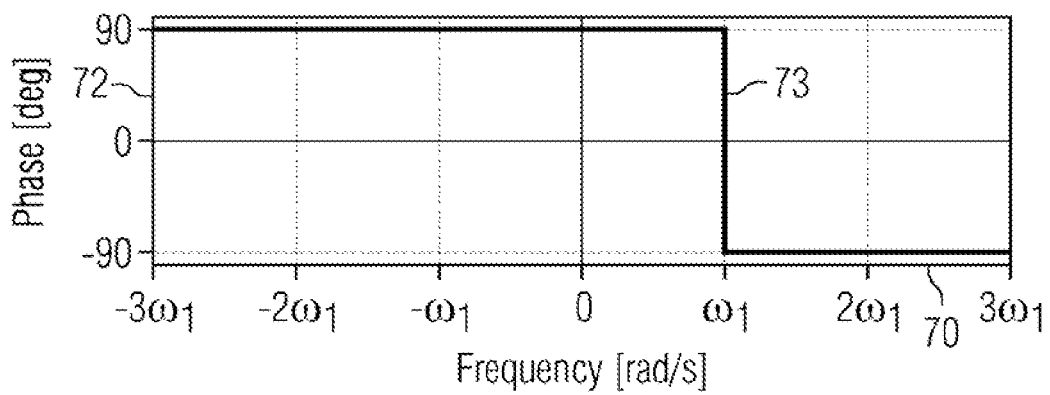
FIG. 4 illustrates characteristics of a complex resonator of an active filter portion as used according to embodiments of the present invention.

FIGS. 3 and 4 illustrate an embodiment of a frequency response of a complex resonator, such as complex resonator 59_1, 59_2 of the active filter system 29 illustrated in FIG. 2 according to an embodiment of the present invention. Thereby, FIG. 3 illustrates the magnitude on the ordinate 69 over the abscissa 70 denoting the frequency, wherein the magnitude is depicted as a curve 71. As can be appreciated from FIG. 3, the magnitude 71 has a peak at a particular frequency $\omega_1$ representing the center frequency of the respective complex resonator.

FIG. 4 denotes on the ordinate 72 the phase and on the abscissa 70 the frequency. The curve 73 represents the phase-response describing the steady state phase-shift the transfer function will apply to the input signal as introduced by the respective complex resonator. At the center frequency the phase shift is precisely zero. It can be seen that for frequencies smaller than the center frequency $\omega_1$, the phase (shift) is 90°, while for frequencies greater than the center frequency $\omega_1$, the phase (shift) is −90°.

As a complex (coefficient) filter, the complex resonator has an asymmetrical magnitude response with respect to positive and negative frequencies (relative to the center frequency). This may allow infinite gain to be applied at one frequency only (in particular the center frequency $\omega_1$), facilitating control of a complex exponential input signal.

Figure 5:
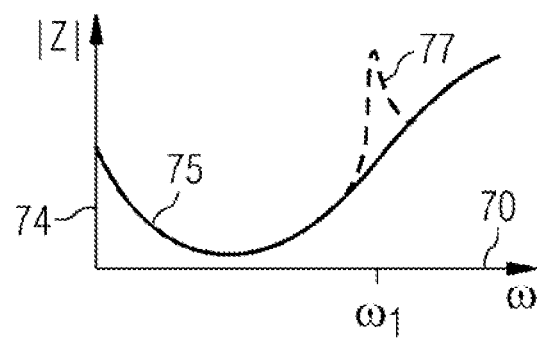
FIG. 5 illustrates an example of a converter impedance as achieved according to embodiments of the present invention.
Figure 6:
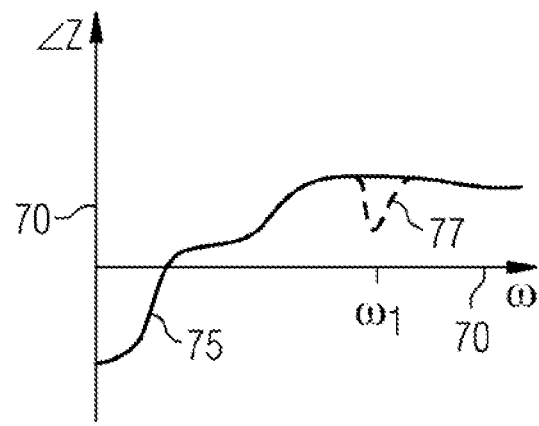
FIG. 6 illustrates an example of a converter impedance as achieved according to embodiments of the present invention.

FIGS. 5 and 6 illustrate graphs where the abscissa 70 denotes the frequency while the ordinate 74 in FIG. 5 denotes the magnitude of the impedance Z and the ordinate 76 of FIG. 6 denotes the phase of the converter impedance Z. The converter impedance Z is the programmed impedance of the converter 9 (including the line inductor L, as the voltage/current used in the active filter as feedback measured at or relates to the grid-side of the inductor), in particular the converter portion 15, when controlled by the control signal 41 also comprising the active filter control signal 39. The solid curve 75 in FIG. 5 denotes the converter impedance magnitude without the active filter control signal 39, while the dashed curve 77 illustrates the converter impedance magnitude while the active filter control signal 39 is included in the converter control signal 41. The same denominations are given in FIG. 6 for the phase of the converter impedance Z.

As can be seen in FIGS. 5 and 6, the magnitude and the phase of the converter impedance with and without the impedance shaping at frequency $\omega_1$ can be considerably different. The original (without the impedance shaping, i.e. without considering the active filter control signal 39) converter impedance is defined by the main converter controller. The original is programmed and/or reshaped through the complex gain R1+jX1 (thus with the impedance shaping, curve 77) to have a larger magnitude and smaller phase-shift at the center frequency $\omega_1$. Thereby, oscillations at this center frequency $\omega_1$ are effectively damped, as the resistive portion of the converter impedance has been increased.

Embodiments of the present invention utilize the active filter system to allow the converter impedance to be programmed to a desired value at a desired frequency through a control structure that sits in parallel to the main converter controller. This may allow the main controller loop to be designed independently of the active filter system. Further, embodiments of the present invention may enable that converter generated voltage harmonics are inherently compensated at the frequencies targeted by the active filter system. Furthermore, as a benefit, embodiments of the present invention may not require bandpass filters allowing a simple overall structure.

The main benefit of not requiring additional bandpass filters may be that less phase shift occurs outside of the center frequency of the complex resonator. This may be important for maintaining the passivity (positive resistance at all frequencies) of the converter.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An arrangement for controlling a converter of a power generation system, the converter being connected to a connection point to a utility grid, the arrangement comprising:
a measurement section adapted to provide measurement values indicative of values of current and voltage at the connection point;
a main converter controller adapted to receive the measurement values and to generate a main converter control signal based on the measurement values;
an active filter system adapted to receive the measurement values and to generate an active filter control signal based on the measurement values; and
an addition element adapted to add the main converter control signal and the active filter control signal to obtain a sum signal and to supply the sum signal as a control signal to the converter;
wherein the active filter system is adapted to dampen at least one low frequency harmonic oscillation generated by the converter and to allow impedance shaping of a converter impedance of the converter for at least one specific frequency.

2. The arrangement according to claim 1, wherein:
the active filter system controls at least one electrical quantity at frequencies different from a frequency at which the main converter controller controls the electrical quantity,
the main converter controller is configured to control power output and/or voltage output and/or current output of the converter at a frequency being different from a center frequency of an active filter control portion.

3. The arrangement according to claim 1, wherein the measurement section is adapted to measure the values of current and voltage at or close to the converter output terminal or at or close to the connection point.

4. The arrangement according to claim 1, wherein the active filter system comprises a plurality of active filter portions for a plurality of center frequencies each outputting a frequency specific active filter control signal, wherein the frequency specific active filter control signals are added to result in the active filter control signal.

5. The arrangement according to claim 1, wherein the plurality of active filter portions are configured to dampen at least one harmonics of a fundamental frequency.

6. The arrangement according to claim 1, wherein the active filter system comprises:
a transformation module for transforming the values of the current and the voltage to a respective α-component and a β-component of a αβ-frame or to a respective d-component and a q-component of the dq-coordinate frame rotating with the fundamental electrical frequency; and
a back-transformation module adapted to back-transform the transformed active filter control signal to derive the active filter control signal.

7. The arrangement according to claim 1, wherein at least one active filter portion is defined by:
a center frequency;

a desired resistance to be achieved at the connection point;
a desired reactance to be achieved at the connection point; and
outputs a center frequency specific voltage signal configured to achieve an impedance of the converter at the center frequency defined by the desired resistance and the desired reactance.

8. The arrangement according to claim 1, wherein at least one active filter portion comprises:
   a multiplication element adapted to multiply a transformed value of a current with a complex number representing a desired resistance and a desired reactance;
   a further addition element adapted to derive a voltage error of the complex number multiplied transformed value of the current and the transformed value of the voltage; and
   a complex resonator tuned at a center frequency adapted to receive the voltage error and output the center frequency specific voltage signal.

9. The arrangement according to claim 8, wherein at least one complex resonator has a transfer function or frequency response having a-response magnitude and response phase, wherein the response magnitude has a peak at the center frequency and the response phase is equal to 90° for frequencies smaller than the center frequency and is equal to −90° for frequencies greater than the center frequency and precisely zero degrees at the center frequency,
   wherein the transfer function is defined by k/;
   where k is a constant;
   s is the Laplace variable;
   j is the imaginary unit; and
   ω1 is the center frequency.

10. The arrangement according to claim 1, wherein the control signal is provided to a grid-side portion of the converter, wherein the control signal is used as a voltage reference for the converter based on which pulse width modulation signals for controllable switches are derived.

11. The arrangement according to claim 1, further comprising at least on passive filter, implemented as:
    at least one inductance series connected between the output terminal of the converter and the connection point; and/or
    at least one capacitance shunt connected to the connection point.

12. A converter system, comprising:
    a converter, having at least a grid-side portion; and
    the arrangement according to claim 1, connected to control the grid-side portion of the converter.

13. A wind turbine, comprising:
    a generator at which a rotor having a plurality of rotor blades is connected; and
    the converter system according to claim 12 connected to generator output terminals.

14. A method of controlling a converter of a power generation system, the converter being connected to a connection point to a utility grid, the method comprising:
    providing measurement values indicative of values of current and voltage at the connection point;
    receiving the measurement values and generating a main converter control signal based on the measurement values;
    receiving the measurement values and generating an active filter control signal based on the measurement values;
    adding the main converter control signal and the active filter control signal; and
    supplying a sum signal as a control signal to the converter;
    wherein at least one low frequency harmonic oscillation generated by the converter is dampened and impedance shaping of a converter impedance of the converter for at least one specific frequency is allowed.

* * * * *